United States Patent
Kamvysselis et al.

(10) Patent No.: US 6,496,908 B1
(45) Date of Patent: Dec. 17, 2002

(54) REMOTE MIRRORING

(75) Inventors: Peter Kamvysselis, Boston, MA (US); Dan Arnon, Boston, MA (US); Mark J. Halstead, Waltham, MA (US); David Meiri, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 63 days.

(21) Appl. No.: 09/860,924

(22) Filed: May 18, 2001

(51) Int. Cl.[7] .............................................. G06F 12/16
(52) U.S. Cl. ........................ 711/162; 709/200; 709/217; 711/147; 711/161; 710/1; 710/6
(58) Field of Search ............................... 709/200, 217; 710/1, 6; 711/161, 162; 1/147

(56) References Cited

U.S. PATENT DOCUMENTS

| | | | | |
|---|---|---|---|---|
| 5,537,533 A | * | 7/1996 | Staheli et al. ................. 714/20 |
| 5,742,792 A | * | 4/1998 | Yanai et al. ..................... 710/1 |
| 5,889,935 A | * | 3/1999 | Ofek et al. ................... 709/217 |
| 5,933,653 A | * | 8/1999 | Ofek .............................. 710/6 |
| 6,157,991 A | * | 12/2000 | Arnon ......................... 711/161 |
| 6,173,377 B1 | * | 1/2001 | Yanai et al. ................. 711/154 |

* cited by examiner

Primary Examiner—Than Nguyen
(74) Attorney, Agent, or Firm—Fish & Richardson P.C.

(57) ABSTRACT

A system for mirroring source data to two or more mirrors includes first and second processors designated to communicate with first and second remote mirrors, respectively. First and second queues in the system receive requests to mirror source data at first and second mirrors, respectively. Each of the queues is periodically scanned by a processor corresponding to the mirror associated with that queue. A mask provides information indicative of any pending mirror requests for sending the source data to the first and second mirrors.

27 Claims, 7 Drawing Sheets

FIG. 1

| m m . . . | . . . . | . . . . | 1 1 . . |
|---|---|---|---|
| m m F . | . . a . | . . s . | 1 1 1 . |
| m m F F | . . a b | . . s a | 1 1 0 1 |
| m . . . | . . . . | . . . . | 1 . . . |
| m . f . | . . b . | . . . . | 0 . 1 . |

REMOTE MIRRORING

FIELD OF INVENTION

This invention relates to data storage, and in particular, to remote mirroring of data.

BACKGROUND

Content providers on the internet often maintain multiple content servers, each of which contains a complete copy of the content contained in a master server. By distributing the task of serving content among multiple content servers, content providers reduce the latency associated with satisfying a request for content. The process of maintaining a complete and current copy of the content stored on a master server is referred to as "mirroring." The content servers on which such copies are maintained are referred to as "mirror servers," or "mirrors."

In a distributed content serving system, it is desirable for a change in the content stored on the master server to be propagated among all the mirrors as quickly as possible. It is also desirable for this propagation to occur automatically and without significantly increasing the latency associated with serving content.

Mirroring is also used to safeguard data in a distributed data storage system. In this application, the content of a mirror is updated in response to changes in the content of a primary data storage system. This, however, introduces latency associated with establishing communication between the primary data storage system and the mirror.

To reduce latency, it is desirable to locate the mirror proximate to the data storage system. This results in faster and more reliable communication between the primary data storage system and the mirror. However, such a mirror does not protect the data against destruction of the premises on which both the primary data storage system and the mirror are located.

In a data storage system, it may be desirable to provide another mirror at a location that is distant from the primary data storage system. However, the introduction of a second mirror means that changes to the data on the primary data storage system must be propagated to two different mirrors. This can increase the latency associated with making changes to the data in the primary data storage system.

SUMMARY

A data storage system incorporating the invention reduces latency associated with mirroring source data at more than one remote mirror by providing data structures that enable a plurality of processors to concurrently mirror source data to more than one remote mirror. This enables a first processor to be mirroring source data at a first remote mirror at the same time that a second processor is mirroring the same source data at a second remote mirror.

The invention provides for mirroring source data at a plurality of remote mirrors by preparing a mask indicating a plurality of remote mirrors designated to receive the source data. This mask is then posted in a common memory that is accessible to a plurality of processors. Each of the processors is associated with at least one of the remote mirrors. For each mirror, a mirror request is placed on a queue associated with that mirror.

Each processor in the plurality of processors scans a queue associated with one of the remote mirrors. When a processor identifies a mirror request in a queue associated with a remote mirror, it attempts execution of the mirror request. The processor then modifies a mask in response to an outcome of that attempt.

In synchronous mirroring, the method provides for the inspection of a status field maintained in the common memory. Through inspection of the status field, it is possible to determine whether each of the processors has attempted to mirror the source data, and if so, whether any of the attempts were unsuccessful.

In the case of synchronous mirror, the method can also provide for the creation of a request buffer in the common memory. The request buffer includes information identifying the source data and, optionally, information derived from the source data that can be used to validate the source data. Each mirror request associated with the mirroring operation includes a pointer to the request buffer.

Optionally, an elapsed time since the queuing of the mirror request is monitored. If this elapsed time exceeds some threshold value, the status field is modified to indicate withdrawal of the mirror request.

The mask identifies where the source data is to be mirrored. In one embodiment, the mask has a plurality of mask elements, each of which corresponds to a remote mirror. To prepare the mask, a subset of the plurality of mask elements is modified to indicate the existence of source data to be sent to a mirror corresponding to the selected mask element.

In some cases, there is an unsuccessful attempt to mirror source data. As a result, an optional feature includes selecting, from a mask, a mask element corresponding to the remote mirrors and modifying the mask element in response to the outcome of the attempt.

Once all mirroring events have been completed, it is useful to send an acknowledgement signal to a host to indicate an outcome of the storage operation. The method can thus include determining whether all mirror requests for mirroring the source data have been attempted. This can be achieved by modifying a first mask if a mirroring attempt was unsuccessful and modifying a second mask if the attempt was successful. Success or failure of each mirroring attempt can be determined on the basis of the first and second mask. To determining whether all mirror requests for mirroring the source data have at least been attempted, the method provides for comparing the first and second masks with a third mask, the third mask containing information indicative of which remote mirrors are to receive the source data.

The invention also includes a system for carrying out the foregoing methods. Such a system includes first and second processors designated to communicate with first and second remote mirrors, respectively. First and second queues in the system receive requests to mirror source data at first and second mirrors, respectively. Each of the queues is periodically scanned by its associated processor. As used herein, the term "periodically" does not imply a regular, fixed period; it instead means "from time to time", or "asynchronously". A mask provides information indicative of any pending mirror requests for sending the source data to the first and second mirrors.

These and other features and advantages of the invention will be apparent from the following detailed description and the accompanying claims, in which:

DETAILED DESCRIPTION

Figure 1:
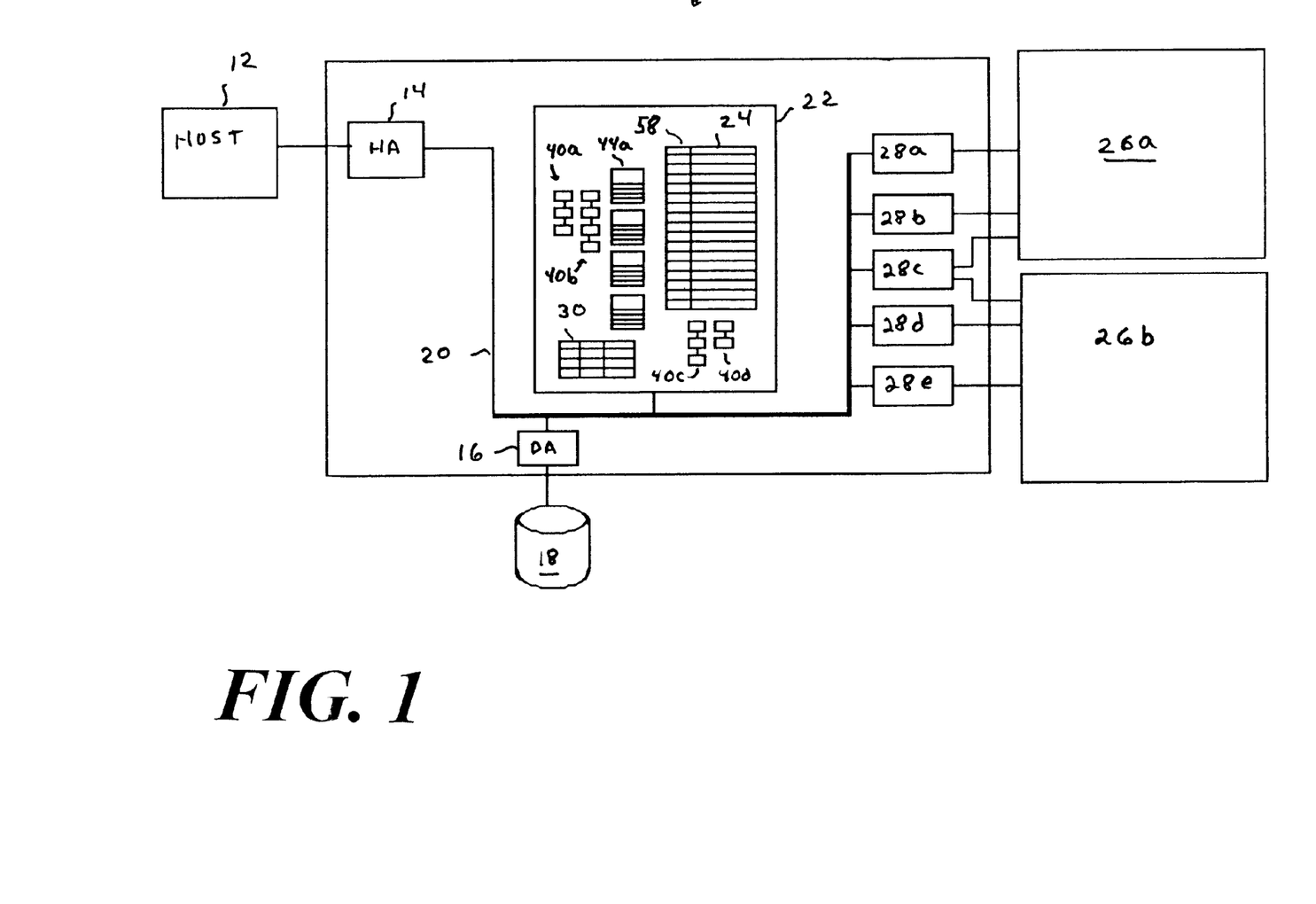
FIG. 1 shows a primary data storage connected to two remote mirrors.

FIG. 1 shows a primary storage system 10 that communicates with a host 12 through a host adaptor 14. The primary storage system 10 also includes a disk adaptor 16 in communication with a disk 18 or other mass storage device. A bus 20 connected to the host adaptor 14 and to the disk adaptor 16 enables those devices to access a global memory 22, also connected to the bus 20.

The illustration of the primary storage system 10 in FIG. 1 is simplified to illustrate the principles of the invention. In reality, the primary storage system 10 can service several hosts, using several host-adaptors, each of which accesses global memory 22 using the bus 20. In addition, the primary storage system 10 can include several disk adaptors for communicating with several disk sets or other mass storage devices. Each disk adaptor 16 also accesses global memory 22 using the bus 20.

In operation, the host 12 communicates to the host adaptor 14 a request to write data to a logical volume. To reduce latency, the host adaptor 14 causes that data to be written to a temporary-storage location 24 in the global memory 22 rather than directly to the disk 18. The host adaptor 14 then sets a write-pending flag associated with that data to indicate that the data contained in that temporary-storage location 24 must be written to the disk 18. The disk adaptors 16 periodically scan the write-pending flags to identify those that are set. When a disk adaptor 16 identifies a temporary data storage location 24 in the global memory 22 having a set write-pending flag, it destages the data in the temporary-storage location 24 to the disk 18 and clears the write-pending flag. As a result, the latency associated with writing the data to the disk 18 is borne by the disk adaptor 16 rather than by the host 12.

To safeguard the data it contains, it is desirable to maintain a current copy of each logical volume at another location. This additional location is referred to as a mirror. The transmission of data from a logical volume to a mirror is an atomic operation that results in a mirroring event. A method for mirroring in a data storage system of the type illustrated in FIG. 1 is described in Yanai et al., U.S. Pat. No. 5,742,792 issued on Apr. 21, 1998, the contents of which are herein incorporated by reference.

A mirror can be another physical disk 18 associated with the primary storage system 10, in which case the mirror is referred to as a local mirror. A mirror can also be a completely separate data storage system, in which case the mirror is referred to as a remote mirror. Note that the adjective "remote" is not intended to imply a great physical distance. A separate data storage system in the same building and one located on another continent are, for purposes of this discussion, both remote mirrors.

When a host 12 requests that data be written to a logical volume, the host adaptor 14 writes the data to the global memory 22 and requests that a mirroring event be executed. When the host adaptor 14 detects that the mirroring event is complete, it sends an acknowledgement back to the host 12 indicating that the data has been written to the logical volume. The time interval between the host's original request and the acknowledgment by the host adaptor 14 depends heavily on the latency associated with completing the mirroring event.

In some cases, it is desirable to mirror the data on more than one remote mirror. For example, a remote mirror located at the same premises as the primary storage system 10, although conveniently located, will not safeguard data against various disasters that may befall the premises themselves. For this reason, it may be desirable to provide a remote mirror located in another city.

The primary storage system 10 shown in FIG. 1 is in communication with first and second mirrors 26a, 26b. Remote-adaptors connected to the bus 20 manage the transfer of data between global memory 22 and the mirrors 26a, 26b. To provide load balancing, several remote-adaptors 28a–28e are used to provide communication between the primary storage system 10 and the first and second mirror 26a, 26b. Although only two mirrors 26a, 26b are shown, it will be apparent that the concurrent mirroring system described herein can be extended to more than two mirrors.

As suggested by FIG. 1, the remote-adaptors 28a–28e can be viewed as belonging to two groups: a first group for communicating with the first mirror 26a and a second group for communicating with the second mirror 26b. The first and second remote-adaptors 28a, 28b belong to the first group. The fourth and fifth remote-adaptors 28d, 28e belong to the second group. The third remote-adaptor 28c belongs to both the first and second group.

The mirrors 26a, 26b are architecturally the same as the primary storage system 10 that they serve. Thus, the terms "mirror" and "primary storage system" are logical terms that designate the function of a physical installation at a particular instant. A particular physical installation can be both a primary storage system 10 backed up by a mirror or a mirror for another primary storage system 10.

Within the global memory 22 is a mirror table 30 that specifies, for each logical volume, where that volume is to be mirrored. The mirror table 30, shown in more detail in FIG. 2, includes a mirror mask 32 that indicates whether or not the logical volume is to be mirrored. For example, in the specific example of FIG. 2: the first logical volume has only a local mirror; the second logical volume has a local mirror and one remote mirror; the third logical volume has a local mirror and two remote mirrors; the fourth logical volume is not mirrored at all; and the fifth logical volume is in fact a mirror for another data storage system.

A mirror mask 32 indicating that a logical volume has one or more remote mirrors does not identify those remote mirrors. To identify the remote mirrors, the mirror table 30 also includes a group mask 34 that indicates which of the available remote mirrors is to be used for mirroring that logical volume. For example, according to the group masks shown in FIG. 2: the second logical volume is to be mirrored by the first mirror 26a; the third logical volume is to be mirrored at both the first and second mirrors 26a, 26b; and the fifth logical volume acts as a mirror for a logical volume defined in the second mirror 26b.

There are two broad classes of mirroring: synchronous mirroring and asynchronous mirroring. The distinction between these two types of mirroring lies primarily in what must occur before the host 12 is entitled to receive an acknowledgement. In synchronous mirroring, the mirroring events must actually be completed before the host adaptor 14 is permitted to send an acknowledgement back to the host 12. In contrast, in asynchronous mirroring, a mirroring event does not need to be completed before the host is entitled to an acknowledgement. Synchronous mirroring thus guarantees that the mirrored data and the locally stored data are identical, whereas asynchronous mirroring does not. The disadvantage of synchronous mirroring is that the latency for each write, as perceived by the host 12, is longer than it would be for asynchronous mirroring.

In one practice of the mirroring system, synchronous and asynchronous mirroring are permitted to coexist. In this practice of the invention, a logical volume can be mirrored synchronously at one or more mirrors and also be mirrored asynchronously at one or more mirrors. In another practice of the mirroring system, all mirrors are required to be synchronous. In yet another practice of the mirroring system, all mirrors are required to be asynchronous.

Figure 2:
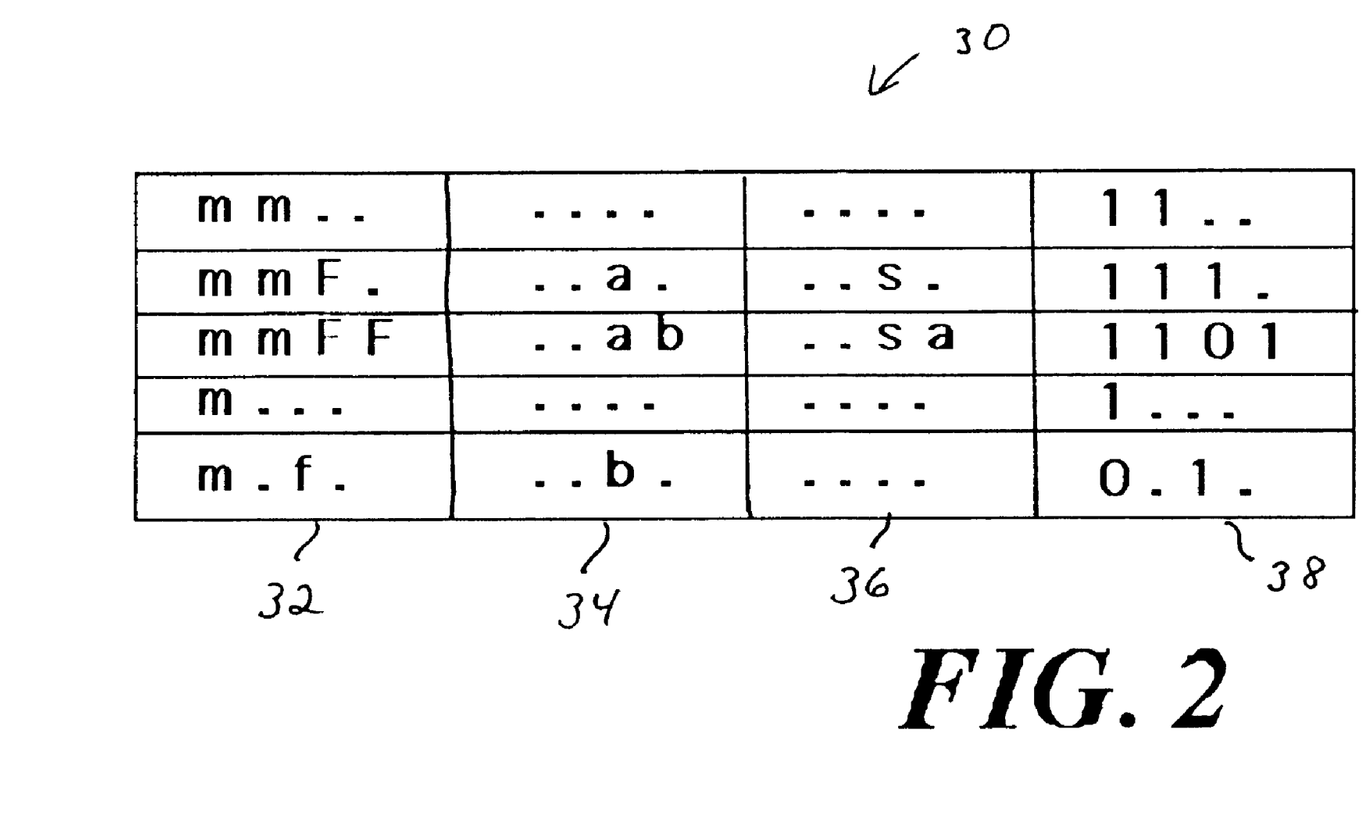
FIG. 2 shows the mirror table in the global memory of FIG. 1.

The mirror table 30 of FIG. 2 includes a class field 36 for specifying the class of mirroring associated with the remote mirrors listed in the group mask. For example, with logical volumes configured as shown in FIG. 2, the second logical volume has a synchronous mirror only, whereas the third logical volume has both a synchronous mirror and an asynchronous mirror.

In some cases, a mirror can become unavailable. This can occur, for example, if the connection to a mirror is severed, or if the mirror itself is off-line. Information on whether or not a particular mirror is available is provided in a ready mask 38 in the mirror table 30.

FIG. 2 is intended to be a logical representation of the mirror table 30. The entries in the mirror table 30 can be implemented by setting appropriate combinations of flags in global memory 22.

The presence of additional mirrors raises the possibility of having to execute more than one mirroring event in response to a write request from a host 12. One approach to the execution of two mirroring events is to execute the mirroring events serially. Although such a system is relatively simple to implement, it is hopelessly inefficient because the latencies associated with each mirroring event always add together.

A preferable approach to executing multiple mirroring events is to execute the mirroring events independently of each other. This is advantageous because the latency associated with the mirroring events can overlap. To the extent this occurs, the host sees no degradation in performance. This approach to executing multiple mirroring events is referred to as concurrent mirroring.

Data Structures Associated with Synchronous Mirroring

In the illustrated embodiment, synchronous concurrent mirroring of a logical volume requires the maintenance in global memory 22 of at least one synchronous-mirroring queue associated with each mirror. In the example shown in FIG. 3, the global memory 22 includes a first synchronous-mirroring queue 40a associated with the first mirror 26a and a second synchronous-mirroring queue 40b associated with the second mirror 26b. Both the first and second synchronous-mirroring queues 40a, 40b are FIFO queues that are accessible by each host adaptor 14. Each synchronous-mirroring 40a, 40b queue can include a variable number of mirror requests 42a–d, 42e–g.

Figure 3:
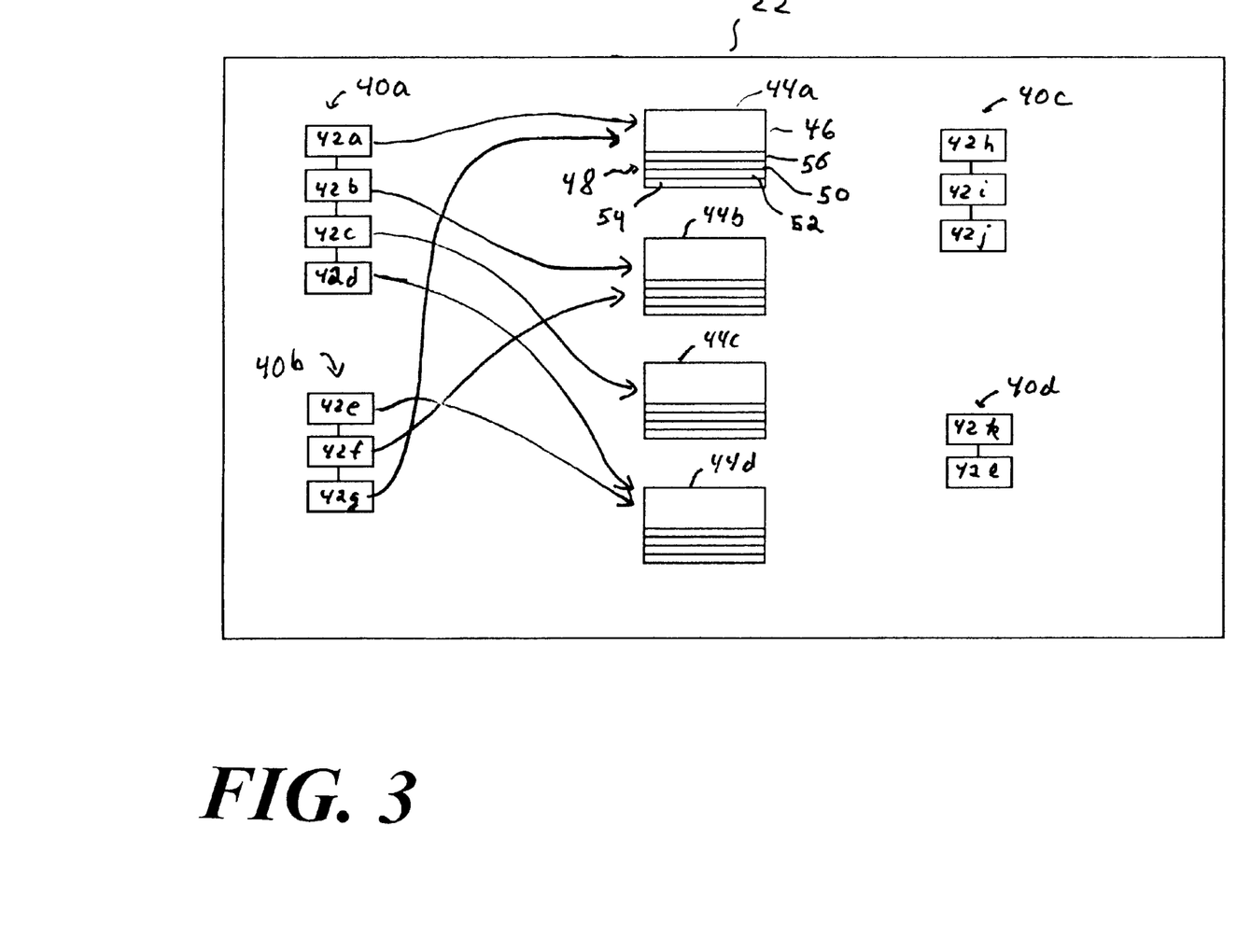
FIG. 3 shows the data structures used in connection with concurrent mirroring.

Each mirror request 42a–g is a request to execute a mirroring event by writing the data to be mirrored (hereafter referred to as "source data") to the mirror associated with the synchronous-mirroring queue 40a, 40b holding that mirror request 42a–g. The mirror requests 42a–d on the first synchronous-mirroring queue 40a are requests to write source data to the first mirror 26a; the mirror requests 42e–g on the second synchronous-mirroring queue 40b are requests to write source data to the second mirror 26b. The source data associated with each mirror request is identified in request buffers 44a–d, also maintained in global memory 22.

Each mirror request 42a–g includes a pointer to one of the request buffers 44a–d in global memory 22. A particular request buffer 44a–b can be, and often is, pointed to by more than one mirror request 42a–g. For example, both the first mirror request 42e in the second synchronous-mirroring queue 40b and the last mirror request 42d on the first synchronous-mirroring queue 40a point to the fourth request buffer 44d. These mirror requests may have been placed on the first and second synchronous-mirroring queues 40a–b in response to a write to the third logical volume, which as indicated in FIG. 2 is mirrored at both the first and second mirrors 26a, 26b. In contrast, the third request buffer 44c is pointed to only by the third mirror request 42c on the first synchronous-mirroring queue 40a. This mirror request 42c may be associated with a request to write to the second logical volume, which is only mirrored on the first mirror 26a. Alternatively, this mirror request 42c may be associated with a request to write to the third logical volume, in which case a matching mirror request on the second synchronous-mirroring queue 40b has already been executed and removed from the second synchronous-mirroring queue 40b.

Each request buffer 44a–d includes a body section 46 that specifies the location and extent of the source data and meta-data derived from that source data to assist in confirming the integrity of that source data. Each request buffer 44a–d also includes a header section 48 that contains information indicating the extent to which all required mirroring events have been completed.

Each header section 48 includes a service mask 50 in which each bit corresponds to a mirror 26a, 26b. The contents of this service mask 50 are specified by the host adaptor 14 as part of making a request for mirroring. A bit that is set indicates that the data identified by the body section 46 is to be copied to the mirror 26a, 26b corresponding to that bit. A bit that is clear indicates that the data identified by the body section 46 is not to be copied to the mirror 26a, 26b corresponding to that bit.

The header section 48 also includes a done mask 52 and a failed mask 54 in both of which each bit corresponds to a mirror. These bits are set by remote-adaptors 28a–e as they attempt to carry out the mirroring events specified in the service mask 50. A set bit in the done mask 52 indicates that a remote-adaptor 28a–e has successfully sent the source data to the mirror corresponding to that set bit. A set bit in the failed mask 54 indicates that a remote-adaptor 28a–e has made an unsuccessful attempt to send the source data to the mirror corresponding to that bit. A clear bit on either the done mask 52 or the failed mask 54 indicates that no attempt has been made to send source data to the mirror associated with that bit. This may occur if the mirror request 42a–g that carries a request to execute that mirroring event has not yet been accessed by a remote-adaptor 28a–e.

The header section 48 of the request buffer also includes a status field 56. The status field 56 indicates whether all mirroring events associated with the request have been either completed or attempted. The status field 56 can also carry information indicating whether any irregularities occurred in connection with the request. The status field 56 thus provides a medium through which the host adaptor 14 and the various remote-adaptors 28a–e involved in any mirroring events can communicate with each other.

Data Structures Associated with Asynchronous Mirroring

Referring back to FIG. 1, each temporary-storage location 24 has a write-pending mask 58. The write-pending mask 58 has a bit corresponding to each mirror. A set bit in the write-pending mask 58 indicates that the data in the temporary storage location is to be sent to the mirror corresponding to that bit.

In the illustrated embodiment, asynchronous concurrent mirroring of a logical volume requires the maintenance in global memory 22 of at least one asynchronous-mirroring queue associated with each mirror. In the example shown in FIG. 3, the global memory 22 include a first asynchrorrous-mirroring queue 40c associated with the first mirror 26a and a second asynchronous-mirroring queue 40d associated with the second mirror 26b. Both the first and second asynchronous-mirroring queues 40c, 40d are FIFO queues that are accessible by each host adaptor 14. Each asynchronous-mirroring queue can include a variable number of mirror requests 42h–j, 42k–l.

Each mirror request 42h–l is a request to execute a mirroring event by writing source data to the mirror associated with the asynchronous-mirroring queue 40c, 40d holding that mirror request 42h–l. The mirror requests 42h–j on the first asynchronous-mirroring queue 40c are requests to write source data to the first mirror 26a; the mirror requests 42k–l on the second asynchronous-mirroring queue 40d are requests to write source data to the second mirror 26b. The source data associated with each mirror request is that contained in the temporary storage location 24.

Host Adaptor Activity: Overview

Figure 4:
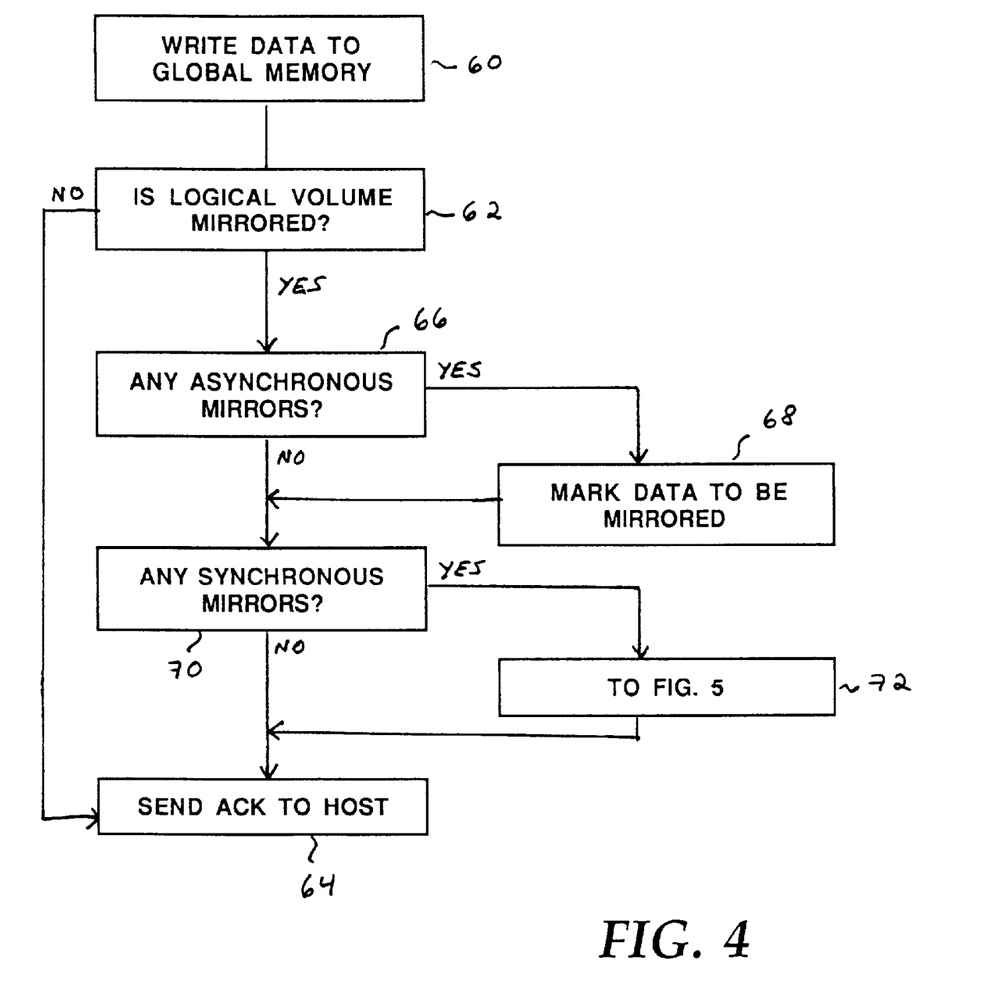
FIG. 4 is a flow-chart illustrating the procedure carried out by a host adaptor upon receiving a write request from a host.

Referring to FIG. 4, when a host 12 requests that source data be stored in a logical volume, the host adaptor 14 first writes 60 the source data to one of the temporary-storage locations 24 in global memory 22. The host adaptor 14 then checks 62 to see if the logical volume is configured for remote mirroring. If the host adaptor 14 determines that the logical volume is not so configured, it sends 64 an acknowledgement signal back to the host 12. If the host adaptor 14 determines that the logical volume is configured for remote mirroring, the host adaptor 14 identifies 66 those mirrors, if any, that are asynchronous mirrors. If any mirrors are asynchronous, the host adaptor 14 marks 68 the copy of the source data that has just been stored in the temporary storage location 24 to indicate that it is to be mirrored. The host adaptor 14 then identifies 70 those mirrors, if any, that are synchronous mirrors. If there are no synchronous mirrors, the host adaptor 14 sends 64 an acknowledgement back to the host 12. If there are one or more synchronous mirrors, the host adaptor 14 carries out 72 the procedure described below in connection with FIG. 5.

Host Adaptor Activity for Synchronous Mirrors

Figure 5:
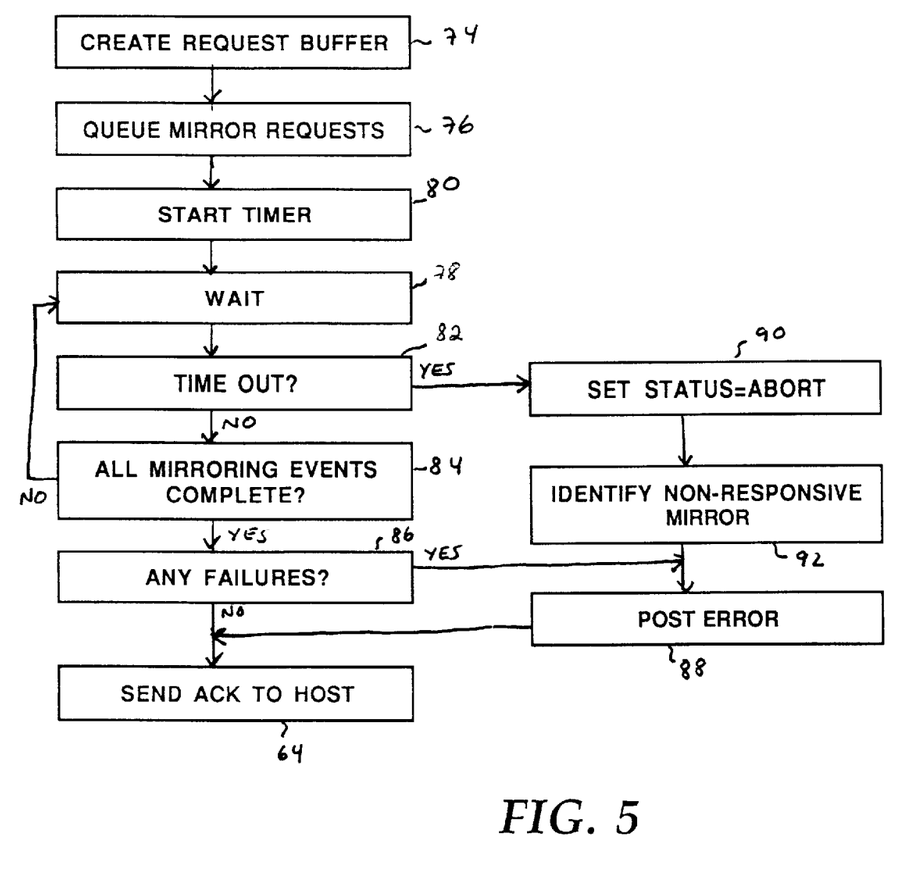
FIG. 5 is a continuation of the flow-chart in FIG. 4 for the case of synchronous mirroring.

Referring now to FIG. 5, if one or more mirrors for the logical volume are synchronous mirrors, the host adaptor 14 creates 74 a request buffer 44a. This request buffer 44a is used by the remote adaptors to identify the source data and to determine when all synchronous mirroring events have been completed.

To create the request buffer 44a, the host adaptor 14 enters, into the body section 46, information to be used by the remote-adaptors 28a–e in identifying the source data. Such information, collectively referred to as meta-data, includes information on where the source data is stored in global memory 22 and information that can be used to verify that the source data in the designated location in global memory 22 is indeed the correct data.

Having completed the body section 46, the host adaptor 14 proceeds to create the header section 48. The host adaptor 14 then uses information from the mirror table 30 to set the service mask 50 to identify those mirrors that are to be used to mirror the source data. Finally the host adaptor 14 sets the status field 56 to correspond to the mirrors specified in the mirror table 30.

In many cases, the service mask 50 and the mirror table 30 identify the same mirrors. However, this is not always true. For example, if an entry in the ready mask 38 indicates that the mirror identified in the group mask 34 is off-line or otherwise disabled, the service mask 50 will not include a set bit corresponding to that mirror. The host adaptor 14 then clears all bits in the done mask 52 and in the failed mask 54.

Once the request buffer 44a has been created, the host adaptor 14 queues 76 mirror requests 42a, 42f in the synchronous-mirroring queues 40a, 40b associated with each of the mirrors specified in the service mask 50. Each mirror request 42a, 42f includes a pointer to the newly created request buffer 44a.

When all the mirror requests 42a, 42f have been entered in the appropriate synchronous-mirroring queues 40a, 40b, all that remains is for the host adaptor 14 to wait 78 until all requested mirroring events have been carried out. However, because of the possibility of an interminable wait, it is desirable to start a timer 80 and to periodically check 82 to see if the elapsed time exceeds a time-out value.

If the elapsed time has not exceeded the time-out value, the host adaptor 14 checks 84 the status field 56 to see if all mirroring events have been completed. If the status field 56 indicates that there are still mirroring events outstanding, the host adaptor 14 continues to wait 78. If the status field 56 indicates that all mirroring events have been completed, the host adaptor 14 determines 86, from the value of the status field 56, whether all mirroring events completed without error. If so, the host adaptor 14 sends 64 an acknowledgement to the host 12. Otherwise, if the status field 56 indicates that there has been at least one unsuccessful attempt to mirror the data, the host adaptor 14 posts 88 an error message.

If the elapsed time exceeds the time-out value, the host adaptor 14 sets 68 the status field 56 to indicate that no further attempts at mirroring are to be made. The host adaptor 14 then identifies 92 those mirroring events that were not attempted. This can readily be achieved by evaluating the Boolean expression:

AND(request, NOT(OR(failed, done)))

Those bits that remain set in the foregoing Boolean expression correspond to requested mirroring events that have not yet been attempted.

Host Adaptor Activity for Asynchronous Mirrors

Referring back to FIG. 4, if one or more mirrors for the logical volume are asynchronous mirrors, the host adaptor 14 sets 90 the write-pending bit corresponding to those mirrors in the write-pending mask 58 associated in the temporary-storage location 24 containing the source data to be mirrored. This serves two functions: it indicates that the source data contained in that temporary-storage location 24 must be destaged to a remote mirror 26a, 26b; and it identifies the remote mirror 26a, 26b that is to receive the source data. The host adaptor 14 then sends 64 an acknowledgement back to the host.

It is significant that the host adaptor 14 does not set any bits in the service mask 50 when the mirror is an asynchronous mirror. This allows the host adaptor 14 to send an acknowledgement back to the host 12 when all mirror-events for synchronous mirrors are complete, even if none of the mirroring events for asynchronous mirroring have been completed.

Disk Adaptor Activity for Asynchronous Mirrors

The disk adaptors of the data storage system scan the write-pending masks of the temporary storage locations 24 in global memory. When a disk adaptor encounters a write-pending mask that has a set bit, it recognizes that the data in that data storage location must be sent to the mirror corresponding to that bit. The disk adaptor therefore creates a mirror request and places it in the asynchronous-mirroring queue corresponding to that mirror. It then clears the bit corresponding to that mirror in the write-pending mask associated with that temporary storage location 24.

Remote Adaptor Activity: Overview

Each remote-adaptor 28a–e communicates with one or more designated mirrors 26a, 26b. When a remote-adaptor 28a is not busy communicating with its designated mirror 26a, it scans the queues 40a, 40c associated with its designated mirror 26a to see if there are any pending mirror requests 42a–d, 42h–j. The remote adaptor 28a scans both the synchronous-mirroring que ue 40a and the asynchronous-mirroring queue 40c. However, since the mirror requests 42a–d pending on the synchronous-mirroring queue 40a directly affect latency as perceived by the host, those mirror requests receive higher priority than mirror requests 42h–j pending on the asynchronous-mirroring queue 40c.

Remote-Adaptor Activity for Synchronous Mirroring

Figure 6:
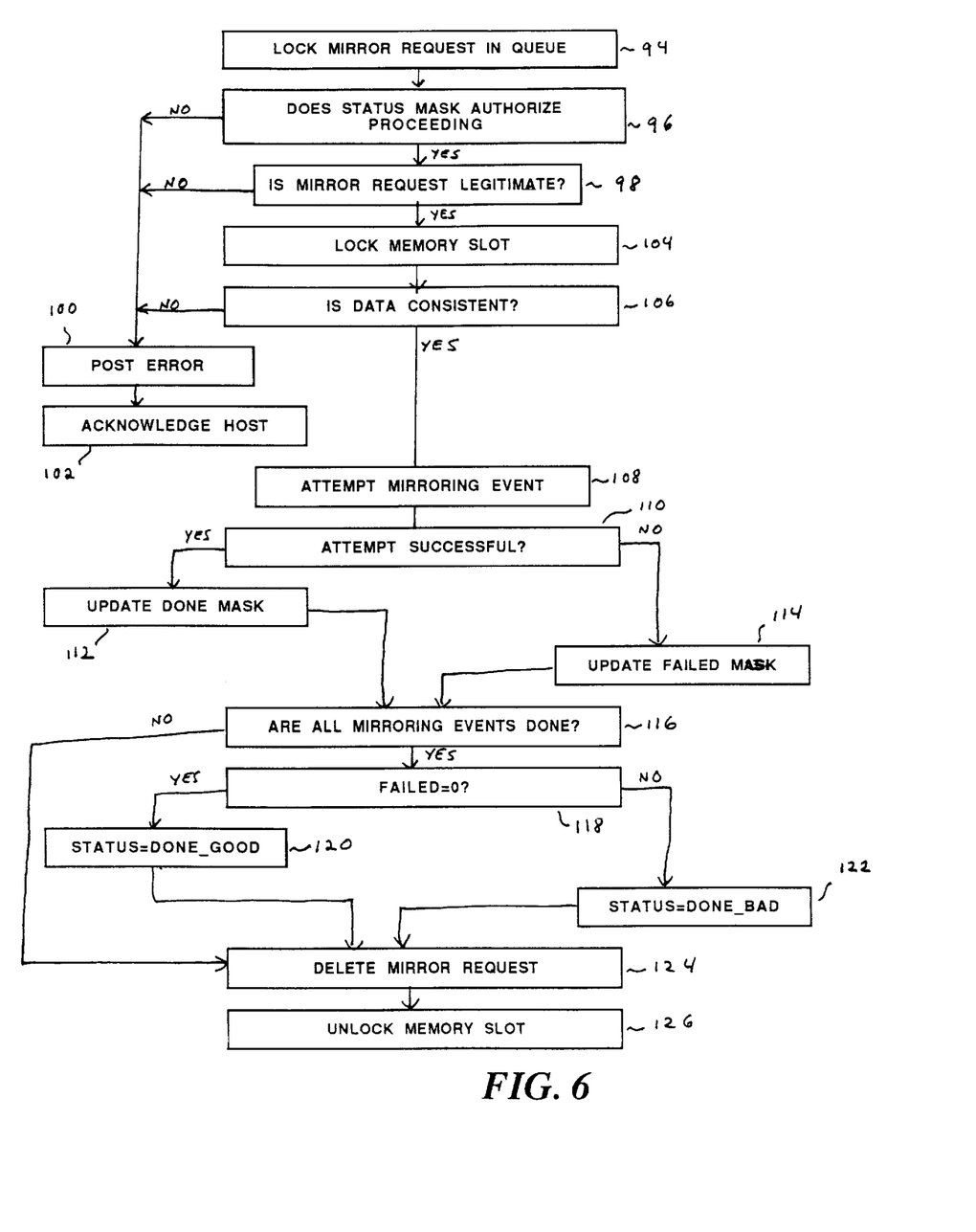
FIG. 6 is a flow-chart illustrating the procedure carried out by a remote-adaptor upon encountering a pending mirror request.

When the remote-adaptor 28a encounters a synchronous-mirroring queue 40a having a pending request, it selects the first mirror-request 42a in that synchronous-mirroring queue 40a and carries out the procedure shown in FIG. 6.

Refer ring now to FIG. 6, upon encountering a pending mirror request 42a in a synchronous-mirroring queue 40a, the remote-adaptor 28a first locks 94 the mirror request and reads 96 the status field 56 to confirm that the mirror request is still requested. The remote-adaptor 28a then verifies 98 the legitimacy of the mirror request 42a by comparing the status field 56 with the mirror mask 32. If the status field 56 is not equal to the mirror mask 32 from the mirror table 30 for that logical volume, the remote-adaptor 28a posts an error message 100 and passes 102 a message to the host adaptor 14 requesting that an appropriate message be passed to the host 12.

The remote-adaptor 28a then engages 104 a read-only lock of the temporary storage location 24. This lock prevents another adaptor from writing to temporary storage location 24. It does not, however, prevent other adaptors from reading from temporary storage location 24.

The remote adaptor 28a then verifies 106 the integrity of the source data itself by reading the meta-data in the body section 46 and checking the global memory 22 to verify that the data stored in the temporary-storage location 24 specified in the body section 46 is consistent with the meta-data in the body section 46. If this is not the case, the remote-adaptor 28a again posts 100 an error message and causes 102 an acknowledgement to be passed to the host 12. Although these error testing steps are not required to implement concurrent mirroring, it is prudent to include them.

The remote-adaptor 28a then attempts 108 to carry out the mirroring event and checks 110 to see if the attempt succeeds. If the attempt succeeds, the remote-adaptor 28a updates 112 the done mask 52 by setting the bit corresponding to that mirror. If the attempt fails, the remote-adaptor 28a updates 114 the failed mask 54 by setting the bit corresponding to the mirror.

The remote-adaptor 28a next checks 116 to see if all mirroring events requested by the host adaptor 14 have been completed. It does so by evaluating the Boolean expression:

OR(done, failed)=request

If the above Boolean expression is true, then all mirroring events have at least been attempted. The remote-adaptor 28a then determines 118 if there are any set bits in the failed mask 54. If there are no set bits in the failed mask 54, then all requested mirroring events have completed successfully, in which case the remote adapter sets 120 the status field 56 to DONE_GOOD. If there is at least one set bit in the failed mask 54, then the remote-adaptor 28a sets 122 the status field 56 to DONE_BAD. In either case, the remote-adaptor 28a deletes 124 the mirror request from the synchronous-mirroring queue 40a and unlocks 126 the temporary storage location 24.

If the above Boolean expression is false, there remain requested mirroring events yet to be attempted. In the example shown in FIG. 3, the remaining mirroring event would be that requested in the second mirror request 42f of the second synchronous-mirroring queue 40b. When this is the case, the remote-adaptor 28a need do nothing further to the request buffer 44a. The remote-adaptor 28a then deletes 124 the mirror request 42a from the synchronous-mirroring queue 40b and unlocks 126 the temporary storage location 24, bypassing the steps 120, 122 of setting the status field 56.

In some cases, the remote-adaptor 28a may, after having followed the pointer from the mirror request 42a to the request buffer 44a, discover that the host adaptor 14 has set the status field 56 to indicate that no further attempts at mirroring are to be made. This can occur when enough time has elapsed between the host-adaptor's posting of the mirror request 42a in the synchronous-mirroring queue 40a and the remote processor's encounter with that mirror request 42a.

Figure 7:
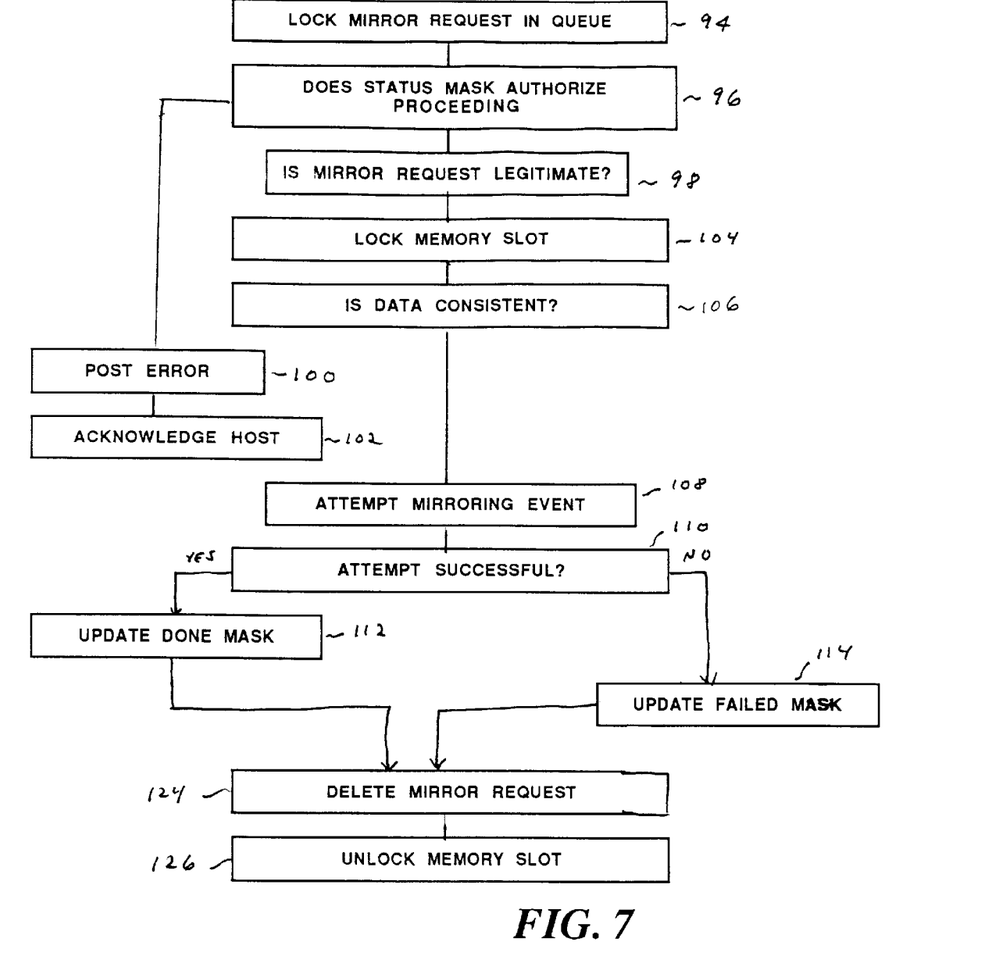
FIG. 7 is a flow-chart illustrating a procedure carried out by a remote-adaptor upon encountering a pending mirror request that has been aborted.

When this is the case, the remote-adaptor 28a carries out a procedure essentially identical to that discussed in connection with FIG. 6, with the exception that there is no need to determine 110 whether all mirroring events have been completed and no need to set the status field 56. In effect, by setting 90 the status field in response to a time-out, (see FIG. 5) the host adaptor 14 asserts exclusive control over the status field 56. The procedure followed by remote-adaptor 28a under these circumstances is set forth in FIG. 7.

Remote-Adaptor Activity for Asynchronous Mirroring

When the remote adaptor 28a encounters a mirror request 42h pending on the asynchronous-mirroring queue 40c, it establishes communication with the mirror 26a associated with that queue 40c. The remote adaptor 28a then transmits to that mirror 26a the data identified by the mirror request 42h. After transmitting the data, the remote adaptor deletes the mirror request 42h from the asynchronous-mirroring queue 40c.

The invention has been described in the context of a system having two remote mirrors. It will be apparent, however, that the method and system described above and claimed in the following claims can readily be extended to data storage systems having more than two remote mirrors.

Having thus described the invention, and a preferred embodiment thereof, that which we claimed as new, and secured by Letters Patent, is:

1. A method of mirroring source data at a plurality of remote mirrors, said method comprising:
   preparing a mask indicating a plurality of remote mirrors designated to receive said source data,
   posting said mask in a common memory accessible to a plurality of processors, each of said processors being associated with at least one of said remote mirrors; and
   queuing, on each of a plurality of queues corresponding to each of said remote mirrors, a mirror request.

2. The method of claim 1, further comprising inspecting a status field maintained in said common memory to determine if each of said associated processors has attempted to mirror said data.

3. The method of claim 1, further comprising inspecting a status field maintained in said common memory to determine if said data has been mirrored at each of said plurality of remote mirrors.

4. The method of claim 1, further comprising monitoring an elapsed time since queuing of said mirror request.

5. The method of claim 4, further comprising modifying said status field to indicate withdrawal of said mirror request when said elapsed time exceeds a predefined threshold.

6. The method of claim 1, further comprising creating a request buffer in said common memory, said request buffer including information identifying said source data.

7. The method of claim 6, wherein queuing said mirror request comprises associating with said mirror request a pointer to said request buffer.

8. The method of claim 1, wherein preparing said mask comprises creating a mask in common memory, said mask having a plurality of mask elements, each of which corresponds to a remote mirror.

9. The method of claim 8, wherein preparing said mask comprises:
selecting a subset o f said plurality of mask elements; and
modifying each of said selected mask elements to indicate the existence of source data to be sent to a mirror corresponding to said selected mask element.

10. The method of claim 1, wherein preparing said mask comprises modifying a mask associated with a data storage location in said common memory, said mask having a plurality of mask elements, each of which corresponds to a remote mirror.

11. The method of claim 10, wherein modifying said mask comprises:
selecting a subset of said mask elements; and
modifying each of said selected mask elements to indicate that data associated with said location is to be sent to a corresponding mirror.

12. A method of mirroring source data at a plurality of remote mirrors, said method comprising:
identifying a mirror request in a queue associated with a remote mirror selected from said plurality of remote mirrors;
attempting execution of said mirror request; and
modifying a mask in response to an outcome of said attempt.

13. The method of claim 12, wherein modifying said mask comprises:
selecting a mask element from said mask, said mask element corresponding to said remote mirror; and
modifying said mask element in response to said outcome of said attempt.

14. The method of claim 12, wherein said mask corresponds to a data storage location in said common memory and modifying said mask comprises altering a mask element associated with said remote mirror to indicate that data associated with said data storage location has been sent to said remote mirror.

15. The method of claim 12, further comprising determining whether all mirror requests for mirroring said source data have been attempted.

16. The method of claim 15, further comprising altering a status field if all mirror requests have been attempted.

17. The method of claim 12, wherein modifying a mask in response to an outcome of said attempt comprises modifying a first mask if said attempt was unsuccessful and modifying a second mask if said attempt was successful.

18. The method of claim 17, further comprising determining, on the basis of said first and second mask, whether all mirror requests for mirroring said source data have been attempted.

19. The method of claim 18, wherein determining whether all mirror requests for mirroring said source data have been attempted comprises comparing said first and second masks with a third mask, said third mask containing information indicative of which remote mirrors are to receive said source data.

20. The method of claim 18, further comprising setting a status field to a value indicative of whether all attempts to mirror said source data were successful.

21. The method of claim 18, further comprising setting a status field to a value indicative of whether at least one attempt to mirror said source data was unsuccessful.

22. The method of claim 21, further comprising deleting said mirror request from said queue.

23. A system for mirroring source data to a plurality of remote mirrors, said system comprising:
a first processor designated to communicate with a first remote mirror;
a second processor designated to communicate with a second remote mirror;
a first queue for receiving mirror requests for said first remote mirror, said first queue being periodically scanned by said first processor;
a second queue for receiving mirror requests for said second remote mirror, said second queue being periodically scanned by said second processor;
a mask providing information indicative of any pending mirror requests for sending said source data to said first and second mirrors.

24. The system of claim 23, wherein said mask is associated with a data storage location in a common memory accessible to said first and second processor.

25. The system of claim 23, further comprising:
a request buffer containing information identifying said source data; and
a first pointer associated with a first mirror request on said first queue, said first pointer pointing to said request buffer; and
a second pointer associated with a second mirror request on said second queue, said second pointer pointing to said request buffer.

26. The system of claim 23, further comprising a status field having a value selected from the group consisting of:
a first value indicating existence of at least one mirror request that has not been attempted;
a second value indicating that all mirror requests for said source data have completed successfully;
a third value indicating that all mirror requests for said source data have been attempted and at least one attempt failed to complete successfully; and
a fourth value indicating that after a lapse of a preselected time, there remains at least one mirror request that has not been attempted.

27. The system of claim 23, further comprising:
a done mask containing information indicative of successful attempts at mirroring said source data; and
a failed mask containing information indicative of failed attempts at mirroring said source data.

* * * * *